United States Patent [19]

Spak

[11] Patent Number: 5,127,662
[45] Date of Patent: Jul. 7, 1992

[54] ATTACHABLE FOLDABLE LUGGAGE CARRIER

[76] Inventor: Jay Spak, 514 Morse St., Oceanside, Calif. 92054

[21] Appl. No.: 566,101

[22] Filed: Aug. 13, 1990

[51] Int. Cl.$^5$ .................................................. B62B 1/04
[52] U.S. Cl. ........................................ 280/40; 280/655
[58] Field of Search .................... 280/655, 654, 40, 37, 280/47.29

[56] References Cited

U.S. PATENT DOCUMENTS

| | | | |
|---|---|---|---|
| 2,729,460 | 1/1956 | Forman | 280/40 |
| 4,087,102 | 5/1978 | Sprague | 280/40 |
| 4,969,660 | 11/1990 | Spak | 280/655 |
| 4,993,727 | 2/1991 | vom Brauckle et al. | 280/655 |

Primary Examiner—David M. Mitchell
Attorney, Agent, or Firm—Lewis E. Massis

[57] ABSTRACT

A foldable luggage carrier frame is provided that can be readily attached to a suitcase, or the like. The frame has a vertical telescoping handle plus a second handle for rotating the wheels from a copolaner position in the frame to an outward usable position. Rotation of the wheels is accomplished by the application of a novel mechanism for converting linear motion to rotary motion.

2 Claims, 2 Drawing Sheets

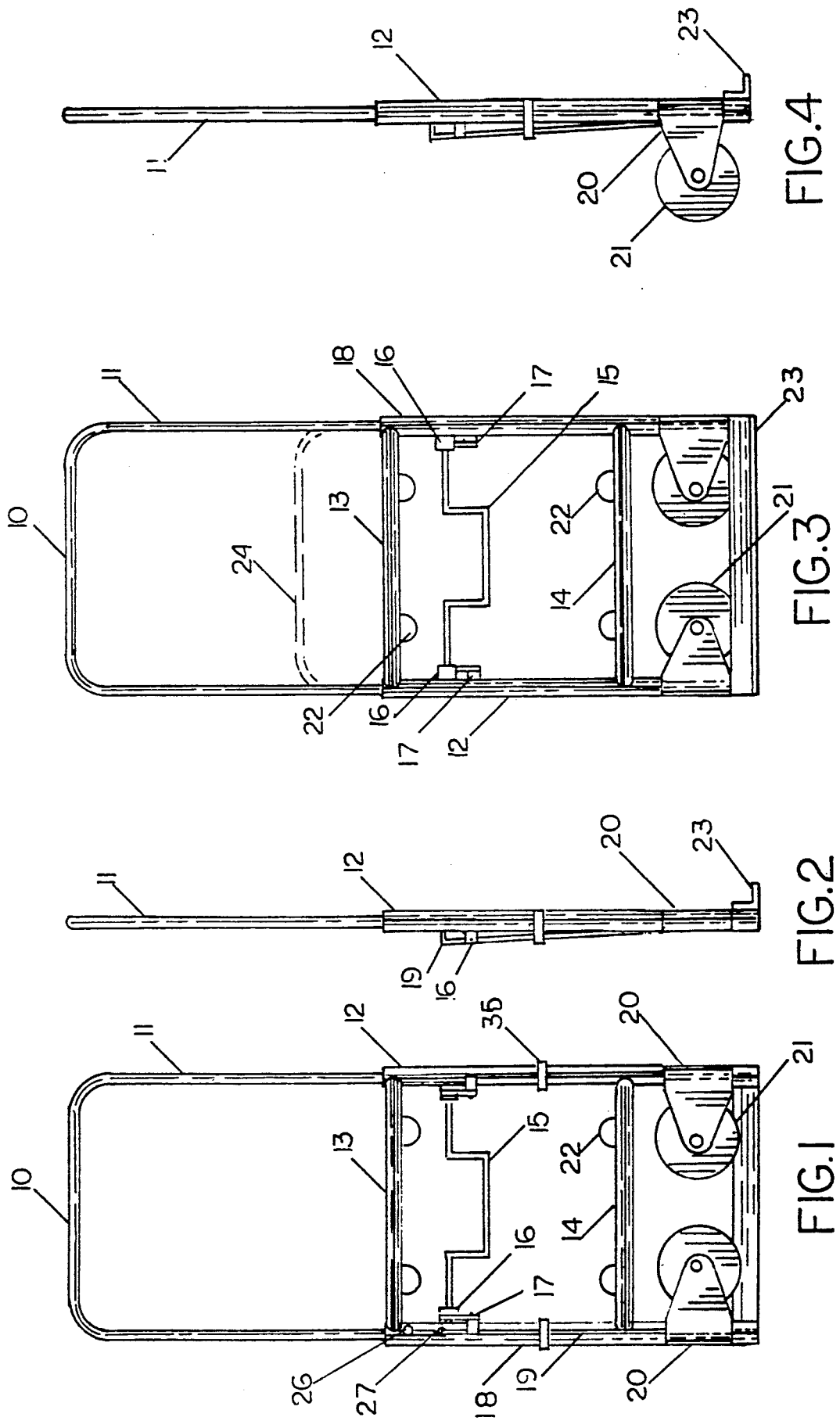

ATTACHABLE FOLDABLE LUGGAGE CARRIER

BACKGROUND OF THE INVENTION

1. Field of the Invention

This invention relates to a foldable frame assembly with a telescoping handle and rotatable wheel assemblies that is readily attached to a suitcase or the like. When fastened to a suitcase the closely fitting frame with folded wheels presents a total thickness flat enough to be stored beneath the passenger seat of an aircraft or train. With the handle extended upwards and the wheels rotated outwardly from the coplanar position the frame serves as a wheeled luggage carrier.

2. Description of the Related Art

U.S. Pat. No. 4,754,985 Im et al, describes a luggage carrier which allows the wheel assemblies to automatically retract to a coplaner inoperative position when the base support member is lifted up, thus reducing the luggage carrier into a narrower area when placed in storage. U.S. Pat. No. 4,062,429 Tabore describes a combined garment bag and carrier constructed as a unit. U.S. Pat. No. 4,315,632 Taylor describes a folding two-wheeled hand truck with handles coupled with the wheels wherein rotation of the handles rotates the wheels on the vertical axis. U.S. Pat. No. 3,947,054 Hall describes a folding luggage carrier, with folding handle and small wheels, that easily folds for storage beneath an aircraft passenger seat.

SUMMARY OF THE INVENTION

The principal objective of the instant invention is to provide a luggage carrier frame assembly that is readily retrofitted to a suitcase, or other luggage, as contrasted to luggage carriers that are separate units. The luggage carrier frame is configured to lie flat against the outer surface of the suitcase providing a thin overall thickness of suitcase and frame to permit storage of the suitcase and frame assembly under the passengers seat of an aircraft. The luggage carrier frame is prepared for use by extending the telescoping handle upwardly and rotating a handle that rotates the wheels outwardly from the coplanar position within the frame assembly. Said handle is coupled to a small diameter rod that moves longitudinally parallel to the vertical frame member from a top locking arrangement downwardly to the wheel support bracket assembly where a linear to rotary conversion mechanism rotates the wheels from the coplanar position outwardly to the usable position.

The longitudinal rod with the top end bent inwardly at 90 degrees to the vertical is locked at either the top or bottom limits of vertical movement by engaging orifices normal to the longitudinal frame member. The wheel rotational handle is coupled to the longitudinal rod by a lever arm which lifts the rod end which is pressing inwardly by spring action from a first orifice and moves the rod to enter the second orifice to lock the wheels in either the coplanar position or the extended position. The bottom end of the longitudinal rod is bent inwardly at 90 degrees to the vertical so as to engage a longitudinal spiral groove in the wheel bracket support tube thus converting the linear movement of said rod to rotational movement of the support tube.

BRIEF DESCRIPTION OF THE DRAWINGS

FIG. 1, is a front view of the attachable foldable luggage carrier frame assembly with the handle extended and the wheels rotated into the coplanar position;

FIG. 2, a right side elevation of the attachable foldable luggage carrier frame assembly with the handle extended and the wheels rotated into the coplanar position;

FIG. 3, is a back elevation of the attachable foldable luggage carrier frame assembly;

FIG. 4, is a right side elevation of the attachable foldable luggage carrier frame with the wheels extended, the left side view being a mirror image thereof;

DETAILED DESCRIPTION OF THE PREFERRED EMBODIMENTS

Figure 5:
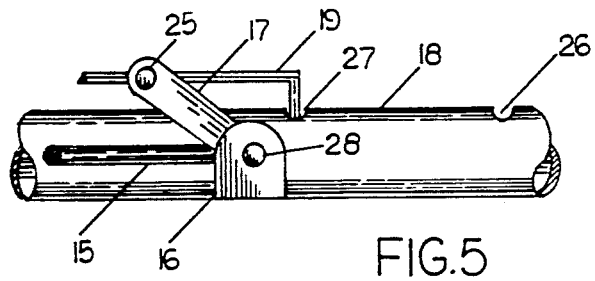
FIG. 5, is a detailed view of the wheel rotation longitudinal lever with locking orifices, in the wheel folded inwardly position.

Referring to FIG. 1 the attachable foldable luggage carrier frame assembly 10 is shown with the upper handle 11 telescopically attached into the vertical frame members 12 and 18 supported by horizontal frame members 13 and 14. A transverse mounted handle 15, rotatable around its horizontal axis, is supported by end bearings 16 fastened to the vertical members 12 and 18. A lever arm 17 fastened to the end of the handle 15 is rotatable attached to the vertical longitudinal rod 19 for moving the rod vertically from the first orifice 27 to a second orifice 26. The end of the longitudinal rod 19 is bent inwardly at 90 degrees for engaging the orifices 26 and 27. The lower end of the vertical rod, guided by bearings 35, entering the mechanism for rotating the wheel bracket 20 and supported wheel 21. Means 22 for attaching the luggage frame 10 to the suitcase, or the like, are shown affixed to the horizontal frame members 23 and 14.

In FIG. 2 the luggage carrier frame 10 is shown with the telescoping handle 11, the vertical frame member 12, the vertical rods 19, the handle hinges 16, the wheel support brackets 20 and the bottom horizontal support bracket 23.

FIG. 3 is a back view of the luggage carrier frame 10 showing the handle in the extended position 11 and in the compressed position 24.

In FIG. 4 the handle 11 is shown in the extended position while the wheels 21 and the wheel support bracket 20 are shown rotated to the outward position.

FIG. 5 shows the wheel rotation handle 15, the attached lever 17, rotatable around the bearing 28 in the hinge 16. Rotating the lever 17 by means of the handle 15, lifts the rod 19 by means of the rotatable fitting 25, to move the rod end out of orifice 27 forward to enter orifice 26 in the frame member 18.

Figure 6:
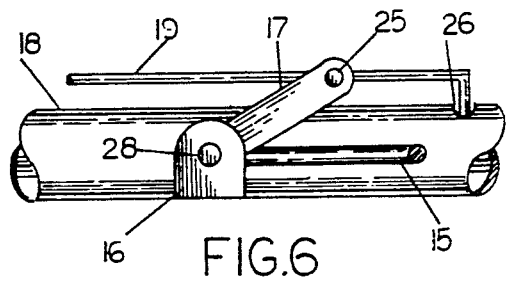
FIG. 6, is a detailed view of the wheel rotation longitudinal lever with locking orifices, in the wheel rotated outwardly position.

FIG. 6 shows the rod 19 engaging the orifice 26, the vertical movement of the rod 19 rotating the wheels to the outward position by means of the linear to rotary mechanism at the base of the frame member 18.

Figure 7:
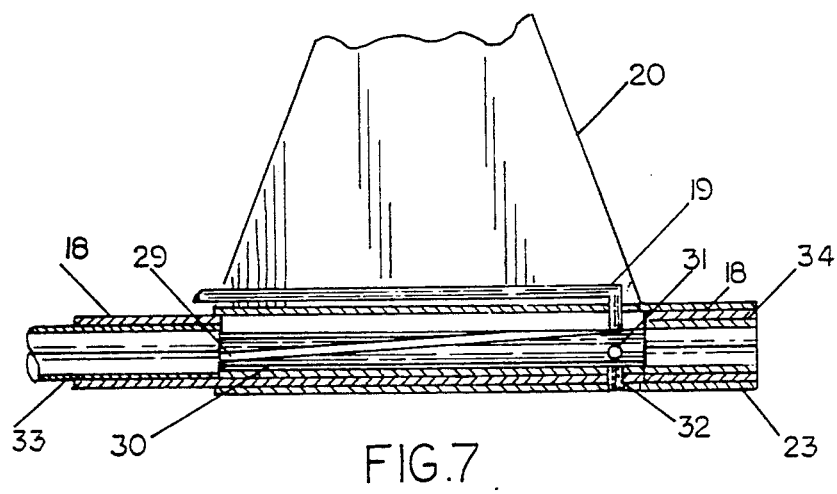
FIG. 7, is a sectional view through 2—2 of FIG. 2.
Figure 8:
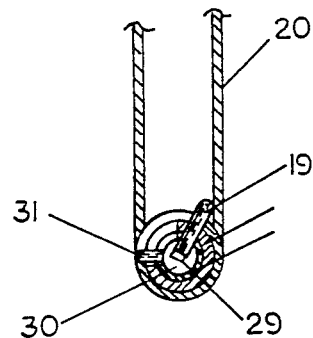
FIG. 8, is a sectional view through 3—3 of FIG. 2.

The mechanism for converting the vertical movement of the rod 19 into rotary movement of the wheel bracket 20 is shown in the sectional view of FIG. 7. The sectional view of the mechanism as shown in FIG. 7 shows the relationship of the rod 19 as the inwardly bent end operates linearly through a longitudinal slot in circular frame member 18 to engage a spiral longitudinal groove in rotatable member 29. Linear movement of rod 19 rotates circular member 29, 90 degrees as the rod moves vertically from orifice 27 to orifice 26. A pin 31 extending radially from circular member 29 through a circumferential slot 32 in members 18 and 34 engages an orifice in the wheel support bracket 20 to rotate the wheel assembly.

I claim:

1. A substantially rectangular foldable carrier frame constructed from metal tubing wherein the improvements comprise:
   (a), two vertical tubular members spaced by a plurality of horizontal tubular members;
   (b), an inverted generally U shaped tubular handle member telescopically fitted in the top portions of the vertical tubular members;
   (c), a transverse handle member rotatable around its horizontal axis extending, on each end, into bearing supports on the vertical tubular member;
   (d), lever arms attached to each end of the handle arranged to be parallel to the handle when the handle is parallel to the vertical tube member;
   (e), the lever arms with attached rotatable fixtures supporting vertical rods aligned parallel the associated tube member by bearings mounted on the vertical tube member;
   (f), the top and bottom ends of the vertical rods formed inwardly at 90 degrees;
   (g), the top ends of the vertical rods arranged to enter linear spaced orifices normal to the vertical tube;
   (h), the handle arm with associated lever arms, when rotated from a downward vertical position to an upward vertical position, lifts the rod end from the lower orifice to the upper orifice; and,
   (i), the vertical rod supported by the guiding bearing is spring loaded to force the rod ends into the orifices.

2. A carrier frame as described in claim 1 wherein the improvements further comprise:
   (a), wheel support brackets with associated wheels rotatably supported at the bottom end of the vertical tube members;
   (b), the wheel support brackets rotated by a radial pin extending from a centered co-axial rod within the vertical tube members;
   (c), a spiral groove extending end to end in said co-axial rod;
   (d), the longitudinal groove sized to accommodate the ends of the vertical rods; and
   (e), vertical movement of the vertical rods sufficient to move the upper ends from the lower orifices to the upper orifices effecting 90 degree rotation of the wheel brackets and associated wheels.

* * * * *